March 20, 1962 R. B. SPAR ETAL 3,025,712
HYDRAULIC CONTROL SYSTEM
Filed Nov. 5, 1959 2 Sheets-Sheet 1
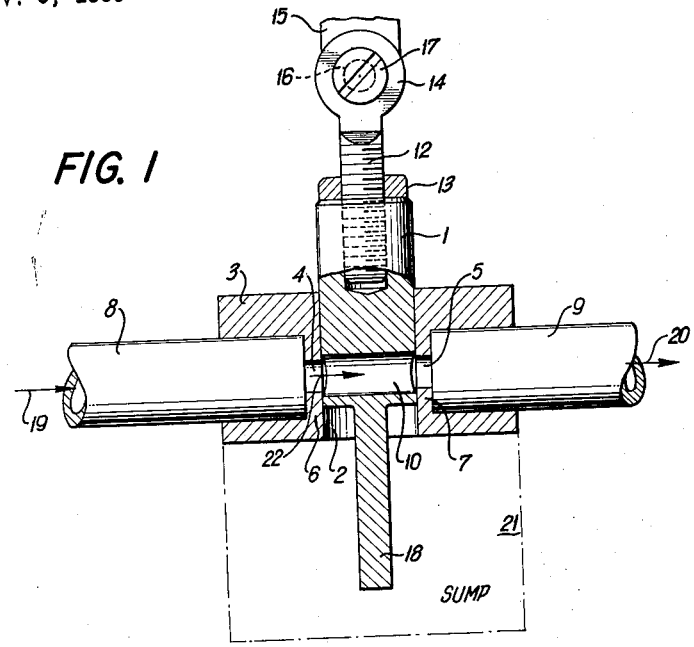
FIG. 1
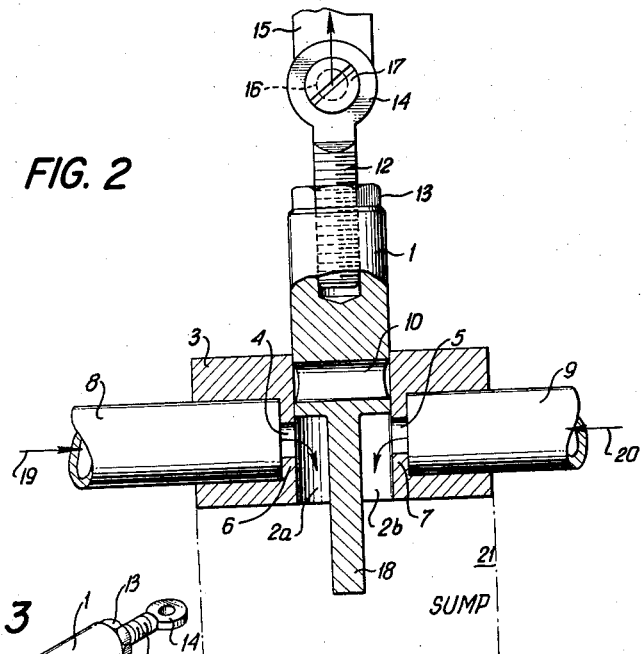
FIG. 2
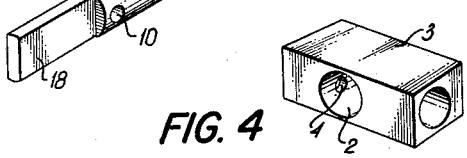
FIG. 3
FIG. 4
INVENTORS.
ROBERT B. SPAR
DONALD SPAR
BY
R. E. Geanque
ATTORNEY.

March 20, 1962 R. B. SPAR ETAL 3,025,712
HYDRAULIC CONTROL SYSTEM
Filed Nov. 5, 1959 2 Sheets-Sheet 2

INVENTORS.
ROBERT B. SPAR
DONALD SPAR
BY
R. S. Geaugue
ATTORNEY.

3,025,712
HYDRAULIC CONTROL SYSTEM
Robert B. Spar and Donald Spar, both of 12601 Burbank Blvd., North Hollywood, Calif.
Filed Nov. 5, 1959, Ser. No. 851,096
11 Claims. (Cl. 74—364)

This invention relates to a hydraulic control system and more particularly to a hydraulic control system employing a novel double-relief slide valve.

In closed-loop servo-controlled hydraulic systems employing servo-valves there is frequently a need for a valve which, in one position or operating condition, will permit communication of a first passage with a second passage, and in its second condition will communicate the first and the second passage with a third passage. Double-relief valves having this general function have been devised heretofore. However, prior valves have been unsuitable for use in certain hydraulic systems since there exists a degree of interaction or communication of the first passage with the second passage in the second or relieved condition.

By means of the valve structure of the present invention there is provided a double-relief valve which will overcome interaction of the first and second passages in the relieved condition. An attendant advantage of the present invention is that there is provided, in the first condition, a straight-through unrestricted opening between the first and second passages thereby minimizing the pressure drop across the valve.

It is, therefore, a principal object of this invention to provide a double-relief slide valve having a straight-through unrestricted opening between the input and output passage in one condition and isolation of the input and output passage in the relieved condition yet permitting unrestricted communication of the input and the output passages with the relief passage.

Another object of the present invention is to provide a simple and reliable double-relief valve having only one moving part for use in hydraulic servo systems requiring isolation of the hydraulic lines in the relieved condition.

Still another object of the present invention is to provide a hydraulic servo system for control of an automatic transmission drive which will direct all of the hydraulic fluid to the sump in one mode of operation and will direct the fluid to the control circuit via a straight-through unrestricted valve in another mode of operation.

Yet another object of the present invention is to provide an automatic transmission drive with a novel manually operated valve which will permit selective control of the mode of operation of the drive.

These and other objects of the invention will be more fully understood in connection with the following description and drawings in which:

FIGURE 1 is an elevational view, partially in section, of the valve of the present invention shown in its first or open condition.

FIGURE 2 is an elevational view, partially in section, of the valve of the present invention shown in its second or relieved condition.

FIGURE 3 is a perspective view of the valve slide member of the present invention.

FIGURE 4 is a perspective view of the valve body of the present invention.

Figure 6:
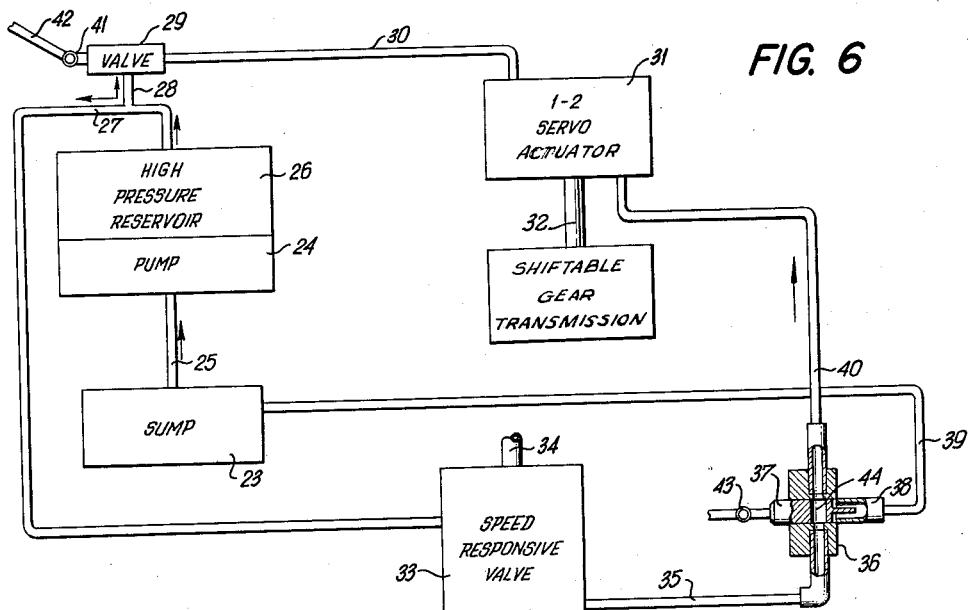
FIGURE 6 is a schematic diagram of the fluid circuit of FIGURE 5 shown in the second gear condition.

Looking now at FIGURE 1 there is shown a double-relief slide valve according to the present invention having a cylindrical valve member 1 which operates in a cylindrical chamber 2 of complementary configuration. The cylindrical chamber 2 is formed in a valve body 3 which has entry and discharge ports 4 and 5 in its end walls 6 and 7 which communicate with conduits 8 and 9. The exterior configuration of the valve body may be of any desired shape or dimension. The valve body shown in FIGURE 4 has a rectangular cross section although it should be understood that it might also be fabricated from hexagonal stock, round stock or material of other shapes.

Valve member 1 is provided with a transverse bore passage 10 which is located for alignment with entry port 4 and discharge port 5 permitting direct communication of conduit 8 with conduit 9.

With the valve member 1 in the open position shown in FIGURE 1, fluid can flow through conduit 8, through entry port 4 into the bore passage 10 in the valve member 1 and through discharge port 5 into conduit 9. Inasmuch as the various elements of the valve are symmetrical, flow through the valve may be in either direction.

The cylindrical valve member 1 may be actuated to move transversely of valve body 3 to change the flow circuit.

The movement of valve member 1 is facilitated by eyebolt 12 which is threadedly attached to the valve member 1. Eyebolt 12 is provided with a lock nut 13 which may be turned to abut valve member 1 to prevent misalignment of the ring portion 14 with respect to bore passage 10 in the valve member. Eyebolt 12 may be connected to an actuating means such as link 15 by means of bolt 16 carried in hole 17 in ring portion 14 of eyebolt 12. Overall alignment of bore passage 10 with respect to ports 4 and 5 is maintained by means of the relative position of link 15 with respect to valve body 3.

A transverse displacement of valve member 1 will close each end of bore passage 10 and will permit communication of entry port 4 and discharge port 5 with valve chamber 2. This condition of the valve is referred to as the "relieved" condition and is shown in FIGURE 2. The lower end of the cylindrical valve member carries a blade-like extension or projection 18 in the form of a downwardly extending plate dividing chamber 2 into a left and right chamber 2a and 2b respectively which communicate with entry and discharge ports 4 and 5 respectively when the valve member is in the position shown in FIGURE 2. Chambers 2a and 2b may be conveniently coupled to a relief passage, a sump or other desired fluid carrying means.

The relieved condition of the valve, as shown in FIGURE 2, permits fluid entering at 19 via duct 8 to pass through entry port 4 and be discharged into the sump 21 via discharge chamber 2a. In a like manner fluid entering at 20 via duct 9 may pass through discharge port 5 into chamber 2b where it may return to sump 21.

The physical configurations of the principal valve elements are shown in FIGURES 3 and 4. In the embodiment shown the relative alignment of passage 10 with respect to ports 4 and 5 is maintained by actuating link 15 thus simplifying the manufacture of the valve. It should be understood, however, that valve member 1 may be provided with any other suitable means, as will be obvious to those skilled in the art, to maintain the relative alignment of the two parts. Also, the complementary cylindrical shapes of valve member 1 and chamber 2 may be replaced by other complementary shapes and still retain the desired characteristics of the valve.

Figure 5:
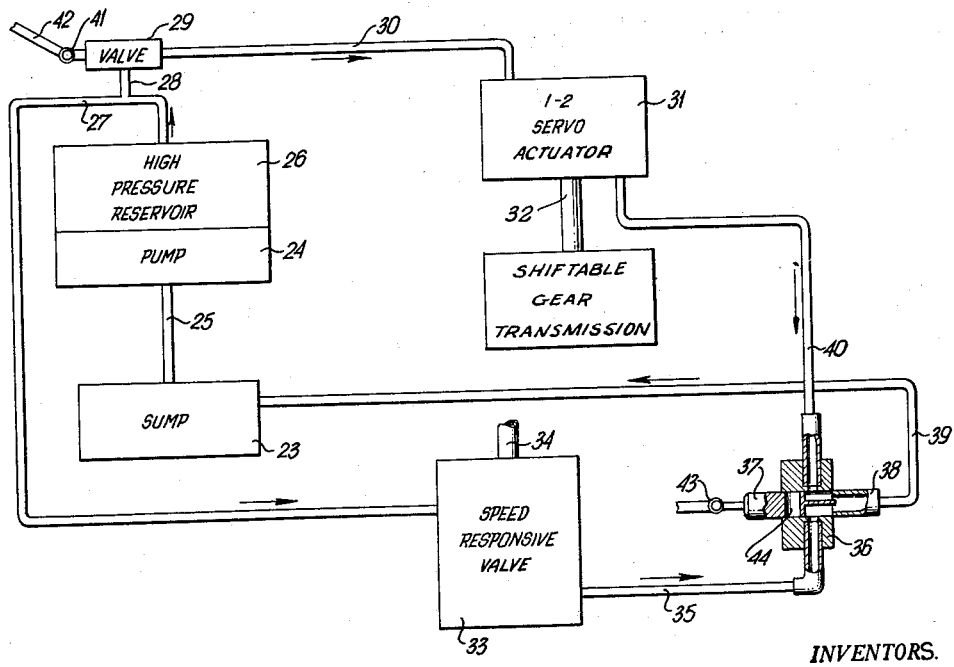
FIGURE 5 is a schematic diagram of the fluid circuit of the first-to-second gear control of a hydraulically-actuated automatic-transmission drive according to the present invention, shown in the first gear condition.

This invention is particularly useful in hydraulically operated automatic transmission drives for automotive vehicles. Automatic transmissions vary as to the detailed configuration and functional arrangement of the elements. The invention is particularly suitable for use in those transmissins in which there is a shift from first (low) gear to second gear which is operated independently from shifts to higher gear speeds. In a typical version of this type of drive there are a plurality of governor controlled or speed-responsive valves and corresponding servo actuators for shifting gears. One of these speed responsive values serves to control the first to second gear servo valve to shift from first gear to second gear at a preset or predetermined speed. Higher speeds are obtained by operation of the remaining speed responsive valve or valves and servo actuator or servo actuators. For purposes of describing the invention, there is shown in FIGURES 5 and 6 a schematic diagram of a two-speed transmission showing the elements employed in shifting from first gear to second gear. It should be understood that a two-speed transmission as contrasted with a three or four speed transmission would not have a plurality of speed responsive valves but would be substantially as shown in FIGURE 5. In the conventional circuit hydraulic fluid in a sump 23 is supplied by means of pump 24 from line 25 into a high pressure reservoir 26 where it may be used to supply various control devices. In the first gear condition as shown in FIGURE 5 the fluid from the high pressure reservoir 26 is coupled to lines 27 and via 28 to selector valve 29. In the normal drive condition this valve 29 is opened permitting hydraulic fluid to flow via line 30 to servo actuator 31 thereby actuating control linkage 32 to establish the first gear ratio of the automatic transmission. Servo actuator 31 is any suitable servo actuator such being well known in the art. For example only, such a servo actuator may have a pair of fluid inlets one of which directs fluid to one side of a piston and the other directs fluid to the opposite side of the piston. Thus a differential pressure will cause the piston to move to one end or the other of its enclosing cylinder as determined by the relative magnitudes of the inlet pressures. The piston may be spring biased to establish an initial condition in the absence of operating fluid pressures. The piston serves to actuate or otherwise control related apparatus. In an automatic transmission the piston moves a linkage which shifts the gears from first to second or conversely. Typical servo actuators exhibit a toggle or detent action which causes the piston to abruptly change from one position to the other without coming to rest at any intermediate position. Hydraulic fluid is also supplied via line 27 to speed responsive valve 33. This valve is of well known construction of the type employing a governor to actuate the valve at a predetermined speed. In the low gear range of speeds governor-controlled linkage 34 will cause speed responsive valve 33 to be closed. The closed condition of the valve will shut off the supply of fluid to line 35. When the required speed is reached the speed responsive valve 33 will open and will thereby reverse the condition of servo valve 31 causing linkage 32 to shift the gear ratio to second gear.

There has been added to the conventional circuit just described a valve 36 according to the present invention. This valve is inserted in the hydraulic line 35 which leads from the speed-responsive valve 33.

The open or close position of selector valve 29 is controlled via a linkage 41 connected with a manual control lever. If the manual control lever 42, conventionally mounted adjacent the steering wheel in an automobile, is in the normal drive position, the higher speeds automatically obtained will actuate the speed responsive valve 33 which will provide the additional hydraulic pressure to the servo valve 31 to operate the first to second shifts, through line 40 (i.e. the required pressure differential will exist between the two inlets to the servo valve 31). Pressure provided by line 30 alone is insufficient to overcome the initial (or biased) condition of the servo actuator. The speed responsive valve 33 must be opened to make possible a shift into second gear.

By the insertion of a double-relief valve 36 according to the invention between lines 35 and 40 it becomes possible to prevent shifting to second or third gear from first gear. Notwithstanding the fact that sufficient speed is attained to open valve 33, the fluid pressure in line 35 is prevented from actuating servo actuator 31 to cause a shift to second gear. At low operating speeds the governor will not bring into operation a shift from first to second. This shift requires the application of pressure through lines 35 and 40 for its operation.

A conventional shut-off valve between lines 35 and 40 will not permit the automatic shifting from first to second gear since a back pressure will build up in line 40 which will ultimately result in sufficient differential pressure to toggle the servo valve 31 to its second gear position. Conventional relief valves also have proved unsuitable for use between lines 35 and 40 since, in the relieved condition, pressure in line 35 will tend to bridge the gap communicating with the discharge side of the relieved valve to a degree sufficient to actuate the servo actuator 31. That is, pressure must be relieved on both sides of valve 36 and at the same time interaction between each side must be prevented. In the absence of such a technique pressure will build up in the downstream side (viz. line 40) of the valve member sufficient to operate the servo actuator.

Accordingly the valve member 37 of the present invention is so constructed, and its associated valve body so related that when the valve is open or relieved, fluid may flow back into the sump 23 via line 39 from both lines 35 and 40 without any undesirable interaction.

When the condition shown in FIGURE 5 is extant the servo actuator 31 will remain in the first gear condition regardless of the condition of the speed responsive valve 33 and/or the actual speed of the automobile. At any desired time valve member 37 may be actuated via link 43 to the open condition as shown in FIGURE 6. If speed responsive valve 33 is open, the opening of valve 36 will cease diverting the fluid to the sump and will permit the fluid to flow directly through the bore passage 44 to the servo actuator 31, thereby causing a shift from first to second gear. This arrangement permits the operator of the automobile to manually override the automatic operation of the transmission. Typically a manual control, conveniently accessible to the operator, is connected to linkage 43.

If desired, linkage 43 may be coupled to linkage 42 in any convenient manner, as will be obvious to those skilled in the art, whereby the selection of automatic or manual operation of the transmission may be affected.

The arrangement described above, whereby the automatic shifting from first to second gear is provided with a manual override is particularly useful when the automobile is climbing a long hill at a relatively low speed such as to result in frequent automatic changes in gear. By actuating valve 36 to the relieved condition the automobile will remain in first gear regardless of the frequent operation of the speed responsive valve 33. Similarly, the system described is useful in racing wherein the operator may wish to obtain a speed in first gear which is higher than the predetermined operating speed of speed responsive valve 33.

Although this invention has been described with respect to particular embodiments thereof, it is not to be so limited as changes and modifications may be made therein which are within the full intended scope of the invention, as defined in the appended claims.

What is claimed is:

1. A double relief slide valve comprising a valve body having an entry port and a discharge port and a relief port therebetween, a valve chamber communicating with said ports, a valve member in slidable engagement with said chamber, said valve member having a transverse passage therein coaxially alignable with said entry port and said discharge port, said valve member further having a projection extending from one end thereof for blocking direct communication between said entry port and said discharge port when said passage is not in alignment with said ports while permitting communication of said relief port with said entry port and with said discharge port, and means for sliding said valve member from said coaxial alignment to said blocking condition.

2. A valve having a first open condition and a second relieved condition comprising, a cylindrical valve member having an actuating means at one end and a bladelike projection at the other end and a transverse bore passage intermediate said ends, a valve body having a cylindrical chamber for receiving said valve member in slidable engagement, an entry port and a discharge port in coaxial alignment in said valve body, the axis of alignment of said ports being perpendicular to the axis of said cylindrical chamber, said bore passage being adapted for communication with said ports in said open condition and said projection being adapted for blocking direct communication between said ports in said relieved condition.

3. A valve as defined in claim 2 wherein said chamber extends through said valve body to provide a relief opening which will communicate with said entry port on one side of said extension and will communicate with said discharge port on the other side of said extension when said valve is in the relieved condition.

4. A valve as defined in claim 2 wherein said actuating means comprises an eyebolt threadedly attached to said valve member whereby actuation is effected by rectilinear translation of said eyebolt.

5. A valve as defined in claim 2 wherein said entry port adjoins an enlarged opening in said valve body to provide a sleeve joint whereby said valve may be coupled to a fluid line.

6. A valve as defined in claim 2 wherein said discharge port adjoins an enlarged opening in said valve body to provide a sleeve joint whereby said valve may be coupled to a fluid line.

7. A valve as defined in claim 2 wherein said relief opening is in communication with a fluid sump to which said ports may be relieved in said relieved condition.

8. In a hydraulically controlled transmission having gears providing a plurality of speed ratios, a source of fluid pressure controlled by a speed-responsive valve and by a manually controlled valve, a servo actuator movable by a manually controlled valve, a servo actuator movable for shifting of the gears, first passage means for connecting said pressure source with said servo actuator and containing said manually controlled valve, second passage means for connecting said servo actuator to said pressure source through said speed-responsive valve, said second passage means containing a valve body, a chamber in said valve body communicating with a first port connecting with said speed-responsive valve and a second port connecting with said servo actuator and a pressure relief port, a valve member slidable in said chamber, said valve member having a transverse passage and a projection extending from one end of said member, means for positioning said valve member within said chamber in either of two positions, the first position of said valve member aligning said first and second ports to permit connection of said speed-responsive valve directly with said servo actuator and the second position placing said projection for blocking direct communication between said first port and said second port while permitting communication of said relief port with said first and second ports.

9. In a hydraulically controlled variable speed transmission, a hydraulic system including a sump, a source of fluid pressure controlled by a speed-responsive valve and by a manually controlled valve, a servo actuator for varying the transmission speed, first passage means directly connecting said actuator with said pressure source and containing said manually controlled valve, second passage means connecting said actuator with said pressure source through said speed-responsive valve, said second passage means containing a control valve having a first open condition for directing fluid from said fluid source to said actuator and a second relieved condition for separately directing fluid from said fluid source and from said actuator to said sump.

10. The hydraulically controlled transmission defined in claim 9 in which said control valve comprises, a cylindrical valve member having an actuating means at one end and an extension at the other end an a transverse bore passage intermediate said ends, a valve body having a cylindrical chamber for receiving said valve member in slidable engagement, an entry port and a discharge port in said valve body in coaxial alignment, the axis of alignment of said ports being perpendicular to the axis of said cylindrical chamber, said bore passage communicating said ports in said open condition of said control valve and said extension blocking direct communication between said ports in said relieved condition of said control valve.

11. The hydraulically controlled transmission defined in claim 10 wherein said chamber extends through said valve body to provide a relief opening communicating with said entry port on one side of said extension and with said discharge port on the other side of said extension when said valve is in said relieved condition.

References Cited in the file of this patent
UNITED STATES PATENTS

| | | |
|---|---|---|
| 752,204 | Cooper | Feb. 16, 1904 |
| 1,140,017 | Ballard | May 18, 1915 |
| 2,204,143 | Meyer | June 11, 1940 |
| 2,282,591 | Orr | May 12, 1942 |